Patented Feb. 19, 1946

2,395,229

UNITED STATES PATENT OFFICE 2,395,229

ANTHRAQUINONE DYESTUFFS

Arthur Lowe and Alan Charlton Robson, Blackley, Manchester, England, assignors to Imperial Chemical Industries Limited, a corporation of Great Britain No Drawing. Application September 8, 1943, Serial No. 501,586. In Great Britain October 9, 1942

4 Claims. (Cl. 260—192)

The present invention relates to the manufacture of new anthraquinone dyes.

It is known to manufacture benzcarbazoles of the anthraquinone series by treating such $\alpha$-arylaminoanthraquinones as contain in the arylamino residue a substituent in the para position and an acylated amino group in an $\alpha$-position of the anthraquinone residue with oxidising agents, and it is also known that these benzcarbazoles are of use as vat dyes, and, when sulphonated, as dyes for wool.

We have now found that water-soluble dyes of the anthraquinone series which dye animal fibres in deeper shades of improved light fastness are produced by treatment of certain of those $\alpha$-arylaminoanthraquinones in which the arylamino residue contains in the para position a benzeneazo group with sulphur trioxide or chlorosulphonic acid, preferably in sulphuric acid as a solvent, with, if necessary, subsequent further treatment with sulphonating agents.

According to the invention we provide a process for the manufacture of water-soluble dyestuffs of the anthraquinone series which comprises treating 4-p-benzeneazoanilinoanthraquinones in which at least one of the 1, 5 and 8 positions of the anthraquinone nucleus is occupied by an acylamino group, the 1, 5 and 8 positions not so occupied being either free from substituents or occupied by a halogen atom, in which the 2 position of the anthraquinone nucleus is either free or is occupied by a halogen atom, an alkyl radical or by a sulphonic acid group, and in which the aromatic nuclei of the p-benzeneazoanilino group may be unsubstituted or may bear as substituents in any position, provided that not more than one position ortho to the NH group is blocked, hydroxyl, alkoxy, amino, alkyl or nitro groups or halogen atoms, with sulphur trioxide or chlorosulphonic acid, preferably in sulphuric acid as a solvent, and, if necessary, further treating with sulphonating agents.

The particular acylamino-4-p-benzeneazoanilinoanthraquinones used as starting materials in the process of the invention are made from the corresponding amino-4-halogenoanthraquinones. The amino-4-halogenoanthraquinone is either first acylated by, for example, treatment with an acid chloride, and then condensed with p-aminoazobenzene, or alternatively, the condensation with p-amino-azobenzene may take place prior to the acylation. In the latter case the amino-4-p-benzeneazoanilinoanthraquinone may, if desired, be acylated, and treated with sulphur trioxide or chlorosulphonic acid according to the invention in one operation. Suitable acylamino-4-p-benzeneazoanilinoanthraquinones which may be used include 4-p-benzeneazoanilino - 1 - benzoylaminoanthraquinone - 2 - sulphonic acid, 4-p-benzeneazoanilino-1-benzoylamino - 2 - methylanthraquinone, 4-p-butylbenzeneazoanilino - 1 - benzoylamino - 2 - methylanthraquinone, 2-chloro-4-benzeneazoanilino-1-benzoylaminoanthraquinone, 2 - bromo - 4 - benzeneazoanilino-1-benzoylaminoanthraquinone, 4-p - hydroxybenzeneazoanilino-1-benzoylamino-2-methylanthraquinone, 4-p-benzeneazoanilino-8-benzoylaminoanthraquinone, 4-p-benzeneazoanilino - 1 - benzoylaminoanthraquinone, 4 - p - benzeneazoanilino - 1 - acetylamino - 2 - methylanthraquinone, 4-o-tolueneazoanilino-1-benzoylamino-2-methylanthraquinone, 4-p-benzeneazoanilino - 1 - p - nitrobenzoylamino - 2 - methylanthraquinone, 2-bromo-4-p-benzeneazoanilino-1-m-chlorobenzoylaminoanthraquinone, 5-chloro - 2 - bromo - 4 - benzeneazoanilino - 1 - benzoylaminoanthraquinone. The term "acylamino group" thus includes amino groups linked to residues both of aliphatic and of aromatic carboxylic acids as for example acetylamino, benzoylamino, nitrobenzoylamino and aminobenzoylamino groups.

The treatment with sulphur trioxide or with chlorosulphonic acid is, as said, preferably carried out in sulphuric acid as a solvent. It may also, however, be carried out in certain other solvents, for example in nitrobenzene.

The term "sulphonating agent" includes all those agents commonly known to bring about the introduction of sulphonic acid groups into aromatic nuclei, for example concentrated aqueous solutions of sulphuric acid monohydrate, sulphuric acid containing various proportions of sulphur trioxide, that is to say oleum of various concentrations, and chlorosulphonic acid, in admixture or not with various proportions of sulphuric acid or other suitable diluent.

It is believed, and this hypothesis is put forward merely by way of explanation, that the formation of many of the new dyestuffs proceeds in two stages whereby there is first formed, by the oxidising action of the sulphur trioxide or chlorosulphonic acid, a derivative of a phthaloyl carbazole which is a water-insoluble substance and this is subsequently rendered soluble by sulphonation. It is preferred to carry out both stages simultaneously and this can normally be achieved by stirring the acylamino-4-p-benzeneazoanilinoanthraquinone with sulphuric acid containing 20% by weight of sulphur trioxide until a test portion poured into dilute aqueous caustic soda gives no insoluble precipitate. Alternatively, when, for example, the acylamino-4-p-benzeneazoanilinoanthraquinone is treated with chlorosulphonic acid in sulphuric acid solution, it is found that there is formed a water-insoluble substance which, when further treated with sulphonating agents gives rise to the new dyestuffs.

The new dyestuffs are brown solids which are readily soluble in water and still more so in aqueous solutions of caustic alkalis but they are almost insoluble in 15% aqueous sulphuric acid. This latter property may be used in their isolation. The reaction mixture is for example added to such proportions of ice and water as to give an approximately 15% aqueous solution of sulphuric acid whereupon the sulphonic acid is thrown out of solution as an insoluble precipitate which is separated by filtration. Subsequently the filter-cake is dissolved in dilute aqueous sodium carbonate and the dye, in the form of a sodium salt is isolated by salting out. The new dyestuffs dye wool in deep brown shades of very good fastness to light and to washing.

The invention is illustrated but not limited by the following examples in which the parts are by weight.

Example 1

5 parts of 4-benzeneazoanilino-1-benzoylamino-2-methylanthraquinone are added slowly to 35 parts of 20% oleum stirred and kept at 18–20° C. by external cooling. When the addition is complete the cooling is discontinued and the mixture is agitated at room temperature until a test portion added to dilute aqueous caustic soda gives no insoluble precipitate. This condition is fulfilled after 4 hours. The mixture is then poured into a mixture of 150 parts of ice and 50 parts of water. There is thus formed a brown precipitate which is filtered off; the filter-cake is dissolved in dilute aqueous sodium carbonate and the dyestuff is precipitated from the solution by addition of salt. It is filtered off and dried. It dyes wool in brown shades of excellent fastness.

Example 2

4 parts of 2-chloro-4-benzeneazoanilino-1-benzoylaminoanthraquinone are added slowly to 30 parts of 20% oleum stirred and kept at 18–20° C. by external cooling. When the addition is complete the cooling is discontinued and the mixture is agitated at room temperature until a test portion added to dilute aqueous caustic soda gives no insoluble precipitate. This condition is fulfilled after 4 hours. The product is then isolated as described in Example 1. It dyes wool in deep brown shades of excellent fastness properties.

Example 3

5 parts of 2-bromo-4-benzeneazoanilino-1-benzoylaminoanthraquinone are dissolved in 35 parts of 20% oleum and the solution is stirred and heated at 30–35° C. until a test portion when added to dilute aqueous caustic soda gives no insoluble precipitate. This is the case after about 4 hours. The product is then isolated as described in Example 1. It dyes wool in deep brown shades.

Example 4

5 parts of 4-benzeneazoanilino-1-benzoylamino-2-methylanthraquinone are dissolved in 18 parts of chlor-sulphonic acid and the solution is stirred at 20° C. for 1 hour and then for 4 hours at 50° C. The mixture is then cooled to room temperature, poured into ice and water, filtered, washed acid free with water and dried.

4 parts of this product are dissolved in 40 parts of 20% oleum at 20° C. and the solution is stirred at 35° C. until after about 2 hours a test portion is completely soluble in dilute aqueous sodium carbonate. The mixture is then poured into a mixture of 120 parts of ice and 40 parts of water. The brown precipitate thus formed is filtered off, the filter cake is dissolved in dilute aqueous sodium carbonate and the dyestuff is precipitated from the solution by addition of salt. It is filtered off and dried. It dyes wool in brown shades of excellent fastness.

Example 5

3 parts of 4-p-butylbenzeneazoanilino-1-benzoylamino-2-methylanthraquinone are added slowly to 20 parts of 20% oleum stirred and kept at 12–15° C. When addition is complete stirring at 12–15° C. is continued for a further 1 hour. The mixture is then poured into a mixture of 80 parts of ice and 40 parts of water. The brown precipitate thus formed is filtered off, the filter cake is dissolved in dilute aqueous ammonia and the dyestuff is precipitated from the solution by the addition of salt. It is filtered off and dried. It dyes wool in fast brown shades.

Example 6

7 parts of 4-p-hydroxybenzeneazoanilino-1-benzoylamino-2-methylanthraquinone are added slowly to 30 parts of 20% oleum stirred and kept at 18–20° C. When the addition is complete the cooling is discontinued and the mixture is agitated at room temperature until after about 6 hours a test portion is completely soluble in dilute aqueous ammonia. The product is then isolated as described in Example 1. It dyes wool in brown shades.

Example 7

4 parts of 4-p-benzeneazoanilino-1-benzoylamino-anthraquinone are dissolved with stirring in 30 parts of 20% oleum at 20° C. The agitation is then continued at 35° C. for 2 hours and finally at 40–45 C. until a test portion when added to dilute aqueous ammonia gives no precipitate. The product is then isolated as described in Example 1. It dyes wool in olive brown shades of very good fastness properties.

Example 8

5 parts of 4-benzeneazoanilino-8-benzoylamino-anthraquinone are added with stirring to 35 parts of 20% oleum at 18–20° C. The solution is then stirred and heated at 30–35° C. until, after 2 hours, a test portion when added to dilute aqueous ammonia gives no precipitate. The product is then isolated as described in Example 1. It dyes wool in reddish brown shades.

Example 9

4 parts of 4-benzeneazoanilino-1-acetylamino-2-methylanthraquinone are dissolved in 35 parts of 20% oleum at 18–20° C. with agitation. The agitation is continued until a test sample shows complete solubility in dilute aqueous sodium carbonate. The product is then isolated as described in Example 1. It dyes wool in reddish brown shades.

Example 10

4 parts of 2-bromo-4-benzeneazoanilino-1-m-chlorobenzoylaminoanthraquinone are added slowly to 30 parts of 20% oleum at 20° C. The agitation is continued at room temperature until after about 2 hours a test portion is completely soluble in dilute aqueous ammonia. This condition is fulfilled after about 2 hours. The product is isolated as described in Example 1. It dyes wool in brown shades of very good fastness.

*Example 11*

3 parts of 5-chloro-2-bromo-4-benzeneazoanilino-1-benzoylaminoanthraquinone are dissolved in 25 parts of 20% oleum and the solution is stirred at 20° C. until a test portion when added to dilute aqueous ammonia gives no insoluble precipitate. The product is then isolated as described in Example 1. It dyes wool in deep brown shades.

*Example 12*

5 parts of sodium 1-amino-4-p-benzeneazoanilino-anthraquinone-2-sulphonate are added slowly to a mixture of 6 parts of benzoyl chloride and 40 parts of chlorosulphonic acid with stirring, the temperature being kept at 18-20° C. by external cooling. After stirring at this temperature for about 2 hours, 40 parts of concentrated sulphuric acid are added and the reaction mixture drowned out in 300 parts of ice and water. The dyestuff is then filtered off and finally isolated by dissolving the filter cake in dilute ammonia solution and salting out. It dyes wool in orange brown shades.

*Example 13*

5 parts of sodium 1-amino-4-p-benzeneazoanilinoanthraquinone-2-sulphonate is added with stirring to a mixture of 6 parts of acetic anhydride and 40 parts of chlorosulphonic acid, the temperature being kept at 18-20° C. by external cooling. After stirring for about 1 hour the mixture is poured into 1000 parts of water and the dyestuff isolated by the addition of salt. It dyes wool in reddish brown shades.

*Example 14*

4 parts of 4-o-tolueneazoanilino-1-benzoylamino-2-methylanthraquinone are added slowly to 30 parts of 20% oleum stirred and kept at 18-20° C. by external cooling. When this addition is complete the mixture is heated to 35° C. with agitation until after about 3 hours a test portion dissolves completely in dilute aqueous sodium carbonate. The mixture is then poured into 500 parts of water, the solution is neutralised by addition of sodium carbonate and the dyestuff precipitated from the solution by addition of salt. It is filtered off and dried. It dyes wool in brown shades of excellent fastness.

We claim:

1. The water soluble dyes of the anthraquinone series which dye animal fibers in brown shades and which are sulfonic acid compounds of 4-benzeneazoanilinoanthraquinone which carries in one of the remaining alpha positions on the anthraquinone nucleus an acylamino group of the class consisting of acetylamino and benzoylamino groups, and in which the 2-position of the anthraquinone nucleus carries a substituent of the group consisting of —H, —Cl, —Br, —CH$_3$ and a sulfonic acid group, the benzeneazoanilino group being of the class consisting of the unsubstituted benzeneazoanilino radical, its alkyl, hydroxy, alkoxy, amino, nitro and halogen nuclear substitution derivatives, but which benzeneazoanilino group contains at least one position ortho to the imino group of the anilino radical free, which 4-benzeneazoanilinoanthraquinone compound has been reacted with a compound of the class consisting of sulfur trioxide and chlorosulfonic acid in sulfuric acid.

2. A sulfonation derivative of 4-p-benzeneazoanilino-1-benzoylamino-2-methylanthraquinone, which 4-p-benzeneazoanilino-1-benzolyamino-2-methylanthraquinone has been reacted with a compound of the class consisting of sulfur trioxide and chlorosulfonic acid in sulfuric acid.

3. A sulfonation derivative of 2-chloro-4-p-benzeneazoanilino - 1 - benzoylaminoanthraquinone, which 2-chloro-4-p-benzeneazoanilino-1-benzoylaminoanthraquinone has been reacted with a compound of the class consisting of sulfur trioxide and chlorosulfonic acid in sulfuric acid.

4. A sulfonation derivative of 2-bromo-4-p-benzeneazoanilino - 1 - benzoylaminoanthraquinone, which 2-bromo-4-p-benzeneazoanilino-1-benzoylaminoanthraquinone has been reacted with a compound of the class consisting of sulfur trioxide and chlorosulfonic acid in sulfuric acid.

ARTHUR LOWE.
ALAN CHARLTON ROBSON.